United States Patent [19]

Hamilton

[11] Patent Number: 4,739,789

[45] Date of Patent: Apr. 26, 1988

[54] LIQUID FLOW CONTROL VALVE

[76] Inventor: Malcolm F. Hamilton, Eastbourne Hotel, Bordeaux Bay, Guernsey, Channel Islands

[21] Appl. No.: 6,660
[22] PCT Filed: May 19, 1986
[86] PCT No.: PCT/GB86/00278
§ 371 Date: Jan. 21, 1987
§ 102(e) Date: Jan. 21, 1987
[87] PCT Pub. No.: WO86/06931
PCT Pub. Date: Dec. 4, 1986

[30] Foreign Application Priority Data

May 21, 1985 [GB] United Kingdom ............... 8512813

[51] Int. Cl.[4] .............................................. A01G 25/00
[52] U.S. Cl. ................................. 137/78.2; 137/78.3; 137/78.5; 137/624.14; 47/48.5; 251/45
[58] Field of Search ................ 137/78.2, 78.3, 78.5, 137/624.14; 251/45; 47/48.5

[56] References Cited

U.S. PATENT DOCUMENTS

| | | | |
|---|---|---|---|
| 2,577,337 | 12/1951 | Lancaster | 137/78.2 |
| 2,907,347 | 10/1959 | Parks | 251/45 |
| 2,965,117 | 12/1960 | Gallacher | 137/78.2 |
| 3,244,372 | 4/1966 | Hanner | 137/78.2 |
| 3,465,771 | 9/1969 | Tishler | 137/78.2 |
| 3,517,684 | 6/1970 | Mitchell | 137/624.14 |
| 3,874,590 | 4/1975 | Gibson | 137/78.3 |
| 3,972,344 | 8/1976 | Chauvigné | 137/624.14 |

Primary Examiner—A. Michael Chambers
Attorney, Agent, or Firm—Biebel, French & Nauman

[57] ABSTRACT

A flow control valve in which a moisture expansible body (18) is adapted to close a bleed valve (24) shutting off a bleed from an inlet chamber (2) through a by-pass (12) to the underside of a thrust plate (9) operatively coupled by a rod (9) to a valve member (26) arranged to close communication between the inlet (2) and an outlet (4) chamber. On absorption of moisture, the body (18) expands to drive thrust rod (21) downwards to close the bleed valve (24) whereby pressure under the thrust plate (9) is relieved and inlet water pressure closes valve member (26) to cut off discharge. On drying the body (18) shrinks relieving thrust rod pressure on the valve (24) which opens under inlet pressure and pressure liquid is bled through passages (25) and the by-pass (12) to drive the thrust plate (9) upwards to open valve member (26) and allow liquid flow from the inlet (2) to the outlet (4) chamber and to discharge (5). The expansible body (18) may be moistened by ambient moisture or controlled wetting may take place by a bleed (14) from the outlet chamber (4) leading via an adjustable throttle valve (15) into an apertured casing (17) containing the body (18) of expansible material.

9 Claims, 1 Drawing Sheet

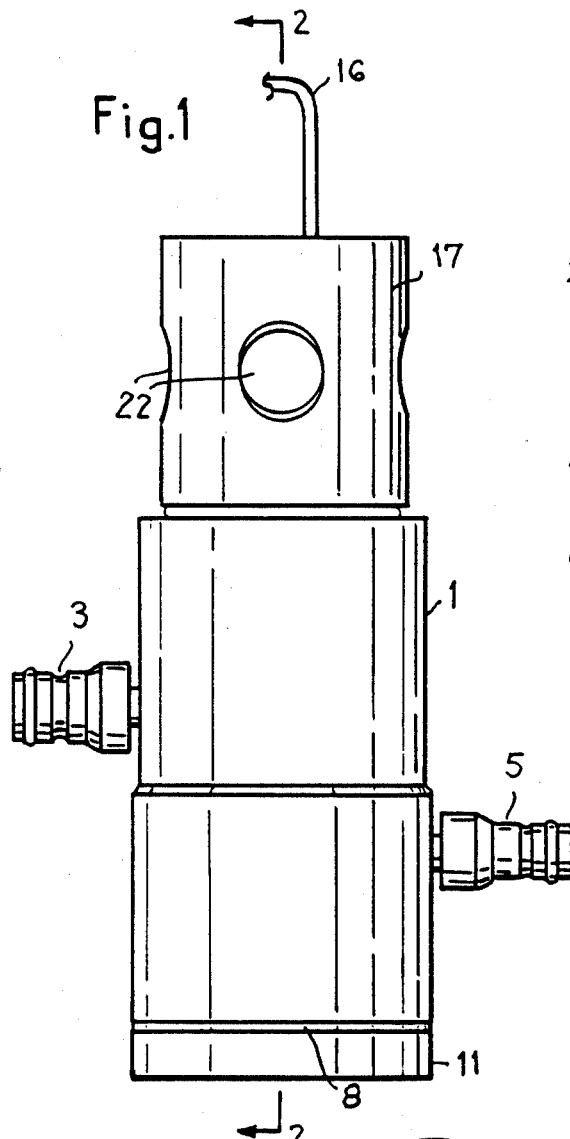

LIQUID FLOW CONTROL VALVE

This invention concerns a liquid flow control valve and particularly to a liquid flow control valve without the need for manual actuation.

Flow control valves are known in which servo control of the valve is possible using electrical or electronic means responding to a signal generated in response to a variable condition, for example a condition varied by the flow of liquid through the valve.

It is also known in a water cistern to control the level of water by a ball-cock having a ball floating on the water in the cistern and opening and closing the ball-cock according to variations in water level, the ball-cock controlling the flow of liquid into the cistern.

It is known from GB-845014 to provide a water responsive actuator for automatically inflatable lifesaving equipment in which a spring loaded plunger is held in a cocked position by a latch held in position by a thrust rod displaceable out of latching position by a stack of washer-like members disposed on the thrust rod and expansible on immersion to drive the rod out of a latching condition. This allows release of the plunger under spring force to operate a gas bottle to release gas.

It is known from U.S. Pat. No. 3,874,590 to provide a flow control valve operatively coupled to a moisture sensing element comprising a stack of moisture sensitive material operating a plunger against a spring loaded ball valve such that on drying of the material the plunger drives the ball against the spring and on moistening of the material the ball is driven by the spring. Under spring action the ball closes a by-pass when the material is wet, and the control valve is closed under supply water pressure. When the material is dry the ball is displaced to open the by-pass and a pressure signal from the water supply through the by-pass augments a spring pressure on a valve member to exceed supply pressure on an opposite side of the valve member to move the valve member to an open condition.

It is known from DE-A-2 513 600 to provide a flow control valve with a moisture sensitive control comprising a moisture expansible tubular member arranged on expansion to release a valve member which allows supply pressure to a closure diaphragm arranged to close a discharge outlet from the control valve. On drying of the expansible member it shrinks and drives the valve member to a closed condition whereby water pressure on an underside of the diaphragm opens the discharge of the control valve.

It is an object to provide an improved flow control valve embodying a moisture expansible control member.

A control valve according to the invention comprises a valve body having a liquid inlet leading to an inlet chamber and a liquid outlet leading from an outlet chamber, the inlet and outlet chambers communicating by a flow passageway closeable by a valve plate having one side facing the inlet chamber and the other arranged sealing to engage a valve seat to close the passageway, a thrust member extends from the valve plate away from the inlet chamber and being supported for opening and closing movement of the valve plate. Distal from the valve plate the thrust member is provided with a thrust plate disposed in a chamber adapted to receive fluid at pressure on a side of the thrust plate opposite the valve plate to drive the valve plate to an open condition. The inlet chamber communicates with by-pass means via a valved passage comprising a valve member moveable under liquid pressure in the inlet chamber to an open condition to allow flow of liquid through the bypass, and closeable from outside the inlet chamber, the by-pass leading to the liquid chamber to operate the thrust plate to open the valve plate, and means for closing the valve member comprising a control member including a thrust rod and a moisture expansible body arranged on expansion to drive the thrust rod to drive the valve member to a closed condition and on shrinking to release the valve member In one arrangement the thrust plate and the liquid receiving chamber are separated by a resilient or flexible diaphragm sealing a liquid receiving space from the thrust plate, the arrangement being such as to allow movement of the thrust plate between open and closed conditions of the valve plate.

Advantageously the control member is arranged and adapted to close the valve member when the body of absorbtive material is wet and to allow opening of the valve member, under the influence of water pressure in the inlet chamber when the body dries. Suitably the body is adapted to be exposed to an external source of moisture, for example an overhead sprinkler system supplied with water flowing from the outlet so that after an interval during which the absorptive material absorbs sufficient water to expand to close the valve member, the by-pass supply to the thrust plate is cut off, and the valve plate closes under the influence of pressure in the inlet chamber to cut off the supply of water to the sprinkler system. This cuts off exposure of the body of water responsive material to water and the body may be allowed to dry by atmospheric evaporation until such contraction takes place that water pressure in the inlet chamber opens the valve member to allow flow through the by-pass to the chamber beneath the diaphragm to operate the thrust member by force on the thrust plate to unseal the valve plate and allow flow from the inlet chamber into the outlet chamber.

As an alternative or in addition the body of expandable material may be exposed to liquid bled from the outlet chamber through an adjustable throttle controlled bleed whereby the time that the expandable body takes to expand to close the valve member may be controllably varied. To this end a bleed tube comprises an adjustable throttle valve with a tube portion leading therefrom to the body to direct bled liquid thereonto. Suitably the tube portion is flexible so that it may be bent over and inserted into an aperture in a cap covering the body of expandable material.

In order to allow the body of expandable material to be exposed to ambient conditions it is suitably contained within an apertured casing mounted on the valve body.

The invention will now be described by way of example with reference to the accompanying partly diagrammatic drawings in which:

FIG. 1 is a side elevation of a control valve according to the invention;

FIG. 2 is a cross-section taken on line 2—2 of FIG. 1,

FIG. 3 is a partially exploded perspective of a valve member and water responsive body of the valve of FIGS. 1 and 2, and FIG. 4 is a cross-section similar to that of FIG. 2 of part of a modified valve.

A valve body comprises a cylindrical member 1 having the inlet chamber 2 and inlet 3 thereto disposed above an outlet chamber 4 and an outlet 5 therefrom, a thrust member 6 extending downwardly through the outlet chamber 5 through a bushing 7 to a thrust plate 9 disposed above a diaphragm 8 in a chamber 10 at the lower end of the cylindrical body 1 and closed by a lower removable closure plate 11. A by-pass 12 extends between the inlet chamber 2 and the lower closure plate 11 externally of the cylindrical body 1, the closure plate 11 being formed with a by-pass passageway part 12A leading to a central aperture 12B below the diaphragm 8 within a recessed portion of the closure plate 11 facing the diaphragm 8. A bleed passage 13 extends from the outlet chamber to a bleed tube 14 externally of the body 1 and extending upwardly from the bleed passage 13 and is formed with an adjustable throttle valve 15 to control the bleed flow. A suitable throttle valve is disclosed EP-A-0 084 938. A flexible bleed tube portion 16 extends upwardly from the throttle 15 to the region of an upper cap 17 defining a casing for a body 18 of liquid expandable material. The casing 17 is releasably closed at its upper end with a threaded plug 19A having a central aperture 20A forming a sliding guide for an upper end of the plunger 21 carrying the body 18, and a series of further apertures 20B for the admission of ambient liquid through the casing to the body. The upper extremity of the flexible tube portion 16 may be inserted into one of these further apertures 20B to direct the bled liquid onto the expandable body 18.

Below the plug 19A the cap-like casing 17 surrounds the body 18 of expandable material and is formed with a series of enlarged side apertures 22 for ambient exposure of the body 18 of expandable material.

The lower end of the casing 17 is substantially closed and that is formed centrally with an upright bore 20C within which a central lower spigot of a button valve 24 is freely floating, the button of the button valve being arranged sealingly to engage an upper side of the lower end of the casing 17. A plug 19B is releasably secured within the casing 1 above the button valve 24 to define below the plug 19B and the closed lower end of the casing 1 a chamber 23 communicating with lateral bleed passages 25 extending radially outwards through the casing 1. The plug 19B is formed centrally with a bore 20B forming a sliding guide for a lower end of the thrust member 21 which is arranged to engage the button of the button valve 24 on an upper side. The lower side of the plug 19B is spaced above the lower end of the casing 1 sufficiently to allow free floating movement of the button therebetween whilst the button spigot loosely guides the button in the bore 20C and allows flow communication through the bore 20C to the chamber 23 when the button is lifted from sealing engagement with the lower end of the casing. The arrangement is such that downward movement of the thrust rod 21 closes the button of button valve 24 against its seating to cut off said flow communication.

The closed lower end of the cap-like housing 17 is releasably mounted in the upper end of the cylindrical valve body 1 in a fluid tight manner with the bleed passages 25 of the cap member communicating with a bleed passage 25A through the wall of the valve body 1 and communicating with the by-pass 12. To this end a pair of axially spaced annular seals 27,28 are disposed between the lower end of the casing 17 and the body 1 to define therebetween an annular chamber 29 communicating with the bleed passage 25 and the bleed passage 25A in communication with the by-pass 12.

The body of expandable and contractable material 18 comprises a stack of absorbant washers 18A mounted on the thrust rod 21 above a pressure plate 21A secured thereto intermediate its ends, and with gridlike spacers 18B to admit flow of liquid radially into the stack. The thrust rod 21 extends downwardly from the pressure plate 21A supporting the washers and slidably engages the upper bore portion 20C in the closed lower end of the cap-like casing 17. The height of the stack of washers 18 is such that with the upper end engaging the underside of the closure plug 19A and the washer being dry the button valve 24 may be lifted from its seating by liquid pressure in the inlet chamber 2 to allow communication between the inlet chamber 2 and the by-pass 12, and with the washers 18A in a wet expanded condition the lower end of the plunger 21 drives the button valve 24 against its lower seating to close the inlet chamber 2 from the chamber 23 and from the by-pass 12. By virtue of the threaded assembly of the closure plug 19A with the casing 17 a measure of adjustment for setting purposes is provided.

The arrangement is also such that on removal of the casing 17 from the cylindrical body 1 access may be had through the inlet chamber to a valve plate 26 which may be a resilient tap washer assembly releasably secured at the upper end of the thrust member 6, for withdrawal and replacement purposes.

The thrust plate 9 at the lower end of the thrust member 6 is of larger diameter than the valve plate 6 or tap washer to facilitate lifting, and the thrust member 6 is suitably mounted in a friction bearing adapted to give a friction resistance to movement of about $1\frac{1}{2}$lbs (680 grams). To this end the thrust member 6 may be slidably mounted between a pair of spaced O-rings supported in the bushing 7.

A vent 10A is provided through the cylindrical body wall from the lower chamber 10 above the diaphragm 8 to allow venting of any liquid which may pass the O-rings from the outlet chamber 5.

Whilst a variety of materials may be used for the washer it is desirable that the characteristics of expansion and contraction are reliably repeatable over protracted periods of exposure. A suitable commercially available paper-like material has been found to be suitable and it has the capability of expanding a stack to about 50% of its dry height and to return to its dry height with an accuracy of about 1 thousandth of an inch in a stack of about $\frac{1}{2}$ inch dry height ($2.54 \times 10^{-3}$ cm in 1.27 cm).

In use the inlet 3 is suitably connected to a water supply at pressure and the outlet to a discharge pipe which may, for example, lead to a watering system such as a water sprinkler.

With the body 18 of washers 18A in a dry condition the water pressure in the chamber 2 lifts the button valve 24 and water is bled through the chamber 23, the bleed passages 25 and 25A to the by-pass 12 to the underside of diaphragm 8 and pressure is applied to the underside of plate 9 in opposition to pressure in the inlet chamber 2 above the valve plate 26, and due to the larger area of plate 9 the valve plate 26 is lifted from its seating to allow communication between the inlet chamber 2 and outlet chamber 4 and flow to the outlet 5 to discharge.

Flow will also occur through the bleed tube 14 and via the throttle valve 15 and the flexible tube 16 through the cap member onto the washers 18A at a rate controlled by the setting of the throttle valve 15. A moisture is absorbed by the washers 18A, the stack will expand between the upper plug 19A and the thrust rod pressure plate 21A to drive the rod 21 downwards against the button valve 24 to seat the button against the lower end of the casing 17 to shut off bleed flow from the inlet chamber 2 via the chamber 23 and by-pass 12 to the underside of the pressure plate 9. As a result pressure in the inlet chamber 2 drives the valve plate 26 on to its seating to shut off flow to the outlet chamber 4 and through the outlet 5 to discharge.

Discharge flow is thus cut off until the body 18 dries and shrinks sufficiently to allow inlet chamber water pressure to lift the button valve 24 and recycle the above described operation.

By suitable adjustment of the throttle valve 15 to regulate the wetting flow to the body 18, the time during which the valve is closed can be controlled. The time taken for the body 18 to dry sufficiently to allow lifting of the button valve 24 will determine the shut off period before recycling, and to a limited degree this may be adjusted by adjustment of the axial position of the upper screwed plug 19A.

As an alternative or in addition to the moistening of the body 18 by the bleed 14,15,16, the valve assembly may be exposed to the water discharge from the outlet 5, for example in the path of discharge of a sprinkler system so that the body 18 is moistened by the main discharge and responds thereto to control the valve operation.

An advantage of the above described arrangement is that the valve is positively shut off by direct closure of the button valve under expansion of the body 18 and the resultant imbalance of water pressure on the valve plates 9, 26 so that risk of excess discharge through the valve due to malfunction is minimised.

In a modification shown in FIG. 4 in which like reference numerals are used for corresponding parts in FIGS. 1-3 the lower plug 19B is formed with a lower cylindrical extension 30 forming a sliding guide for the lower elongate portion of the thrust rod 21 and having intermediate its upper and lower ends an annular flange 31 which sealingly engages a seating at the lower end of the casing 17 to define below the plug 19B and around the extension 30 above the flange 31 a chamber 23. Bleed bores 32 extend through the extension 30 above the flange 31 and an O-ring 33 is mounted on the extended rod 21 so that on expansion or contraction of the body 18 the O-ring moves downwardly or upwardly past the bleed bore 32 to close or open the chamber 23 from or into communication with the inlet chamber 2. The O-ring 32 serves the previously described function of button valve 24 which is omitted from this embodiment.

I claim

1. A liquid flow control valve comprising:
   a valve body (1) defining a fluid inlet (3) leading to an inlet chamber (2), and a fluid outlet (5) leading from an outlet chamber (4), the inlet and outlet chambers (3,4) communicating by a flow passageway;
   a valve plate (26) disposed within said body having one side facing the inlet chamber (2) and the other arranged sealingly to engage a valve seat defined by said passageway to close the passageway;
   said body defining a thrust chamber (10) opposite the inlet chamber from the outlet chamber and connected to receive fluid at pressure from the fluid inlet;
   a thrust member (6) extending from the valve plate (26) away from the inlet chamber (2) and being supported for opening and closing movement of the valve plate (26), the thrust member having a distal end from the valve plate (21);
   a thrust plate (9) connected to the thrust member and disposed in the thrust chamber to receive fluid at pressure on a side of the thrust plate (9) opposite the valve plate (26) to drive the valve plate (26) to an open condition;
   by-pass means communicating with the inlet chamber and including a valved passage (24), a by-pass passage (22) leading from the valve pasage, and a valve member (24) disposed in the valve passage movable under fluid pressure in the inlet chamber (2) to an open condition for allowing flow of fluid through the by-pass passage (12), and closeable from outside the inlet chamber (2), the by-pass passage (12) leading to the thrust chamber (10) to operate the thrust plate (9) to open the valve plate (26); and
   means for closing the valve member (24) including a control member having a moisture expansible body (18) secured within the valve body and a thrust rod (21) located in contact with the expansible body, the expansible body arranged on expansion to drive the thrust rod (21) to drive the valve member (24) to a closed condition and on shrinking to release the valve member (24).

2. A valve as claimed in claim 1, further comprising a resilient diaphragm disposed within the valve body to separate the thrust plate (9) and the thrust chamber (10).

3. A valve as claimed in claim 1, further comprising an adjustable throttle controled bleed (13, 14,16) connecting the outlet chamber and the moisture expansible body, whereby the time that the expansible body (18) takes to expand to close the valve member (24) may be controllably varied.

4. A valve as claimed in claim 1, further comprising an apertured (22) cap-like casing (17) mounted on the valve body (1) and containing said expansible body to expose the expansible body (18) to ambient conditions.

5. A valve as claimed in claim 4, further comprising a pressure plate (21A) secured to the thrust rod (21), the expansible body (18) being mounted within the casing (17) and arranged to act on the pressure plate.

6. A valve as claimed in claim 5, wherein the expansible body (18) includes a stack of washer-like layers (18A) mounted on the thrust rod (21).

7. A valve as claimed in claim 6, wherein the expansible body further includes grid-like spacers (18B) mounted on the thrust rod (21) to facilitate flow of liquid into the stack.

8. A valve as claimed in claim 1, wherein the valve member (24) includes a button valve having a lower spigot, and the valved passage communicates with the inlet chamber and a bleed chamber (23), the lower spigot being freely slidable within the valved passage and the button being freely floating in the bleed chamber (23) in the path of the thrust rod (21), whereby expansion of the expansible body (18) drives the thrust rod (21) to seat the button valve (24) to close the valved passage (20C).

9. A valve as claimed in claim 1, wherein the valve member (24) includes an O-ring (33) mounted on the thrust rod (21) and movable therewith in sealing engagement with the valved passage, for opening and closing a bleed aperture defined in the valve body and leading to the bleed chamber (23) defined in the valve body and communicating with the by-pass passage(12).

* * * * *